United States Patent [19]

Willman

[11] 3,999,444
[45] Dec. 28, 1976

[54] INSTANT REVERSING TRANSMISSION

[76] Inventor: Arthur R. Willman, P.O. Box 389, Yorkville, Ill. 60560

[22] Filed: Oct. 30, 1975

[21] Appl. No.: 627,242

[52] U.S. Cl. .......................... 74/218; 74/665 GE; 74/722; 74/724; 180/6.66; 192/48.7
[51] Int. Cl.² .................. F16H 9/00; F16H 37/06; B62M 27/00; F16D 21/08
[58] Field of Search ................ 180/6.66, 6.4, 6.32, 180/6.26, 6.24, 6.2; 74/722, 724, 665 GE, 425, 218, 220; 192/48.7

[56] References Cited

UNITED STATES PATENTS

| | | | |
|---|---|---|---|
| 2,206,598 | 7/1940 | Dartnell | 180/6.66 X |
| 3,230,694 | 1/1966 | Fairbank et al. | 180/6.66 X |
| 3,255,834 | 6/1966 | Snavely | 180/6.66 |
| 3,448,818 | 6/1969 | Davis | 180/6.66 |
| 3,743,043 | 7/1973 | Gelinas | 180/6.2 |

Primary Examiner—Leonard H. Gerin
Attorney, Agent, or Firm—Clarence A. O'Brien; Harvey B. Jacobson

[57] ABSTRACT

A power transmission is provided including a pair of input shafts with a first gear train drivingly connecting the input shafts for equal inverse rotation. An output shaft is also provided and second gear train structure drivingly connects each of the input shafts to the output shaft for rotation of the latter in response to inverse rotation in the input shafts. Also, a powered shaft is provided and torque transmitting structure drivingly connects the powered shaft to a selected input shaft for rotation of either input shaft in the same direction in response to a given directional rotation of the powered shaft. The power transmission is duplicated in a second transmission with the output shafts of the power transmissions drivingly connected to opposite side drive wheels of a vehicle, whereby the power transmissions may be equally actuated for forward and reverse movement of the associated vehicle as well as inversely operated for steering the associated vehicle.

9 Claims, 8 Drawing Figures

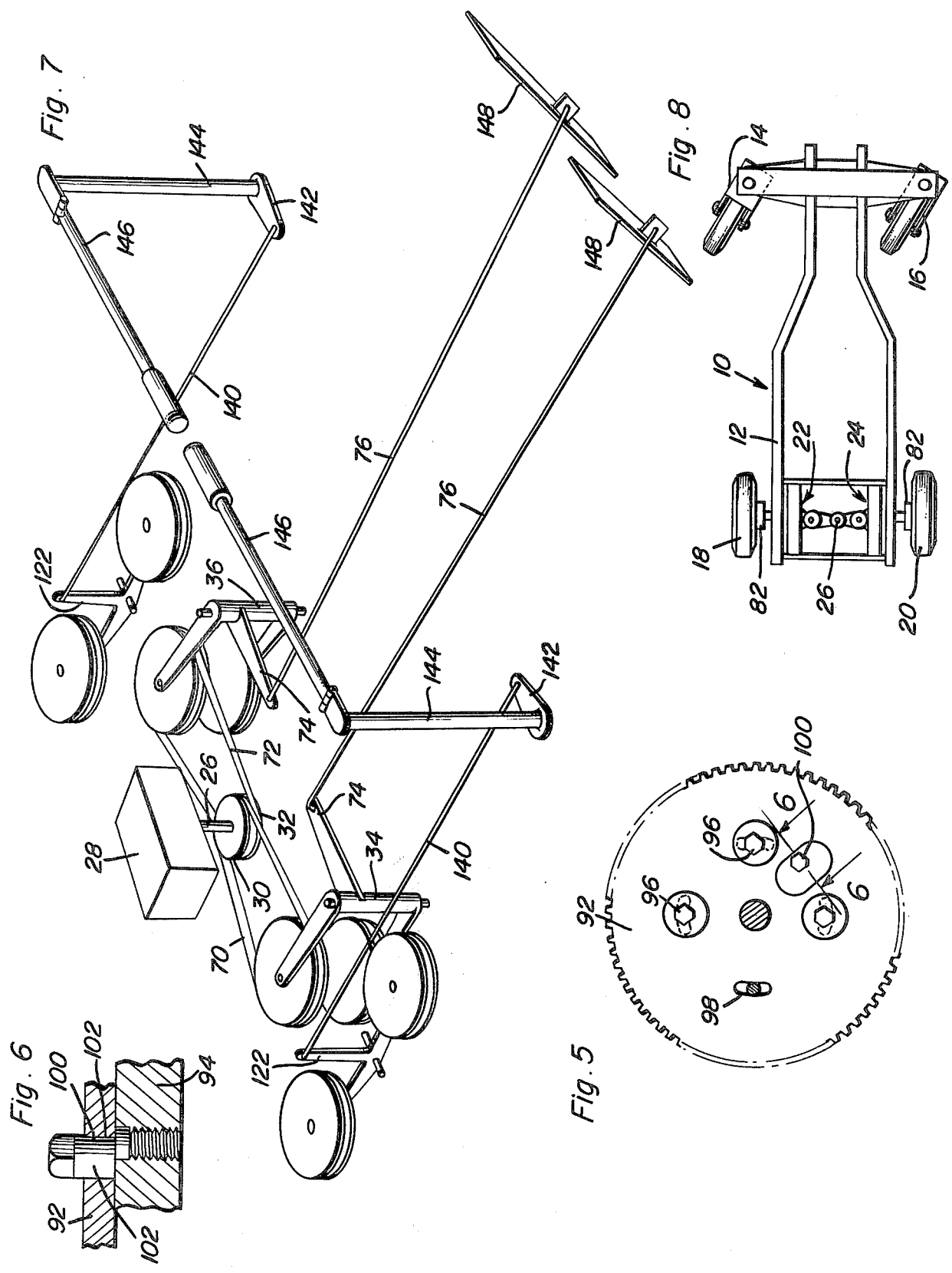

INSTANT REVERSING TRANSMISSION

BACKGROUND OF THE INVENTION

Various forms of power transmissions for use in driving land vehicles and the like have been heretofore provided and examples of various forms of power transmissions including some of the structural features of the instant invention are disclosed in U.S. Pat. Nos. 1,665,974, 2,799,175, 2,892,505, 2,930,246, 3,285,084 and 3,715,928.

However, while these previously known power transmission devices have in some instances been capable of instant reversing operation and others have been constructed in a manner whereby steerage of the associated vehicle may be accomplished by selectively driving opposite side wheels of the vehicle, most of these previously known power transmission devices have included complex drive arrangements and have not been operable to provide both instant reversing operation as well as vehicle steering ability by selectively driving opposite side wheels of the vehicle.

BRIEF DESCRIPTION OF THE INVENTION

The transmission of the instant invention may be utilized by itself or in coaction with a second identical transmission with the two transmissions driving opposite side wheels of a vehicle. When two transmissions of the instant invention are utilized to drive opposite side wheels of an associated vehicle, the vehicle may be instantly reversed and steered by selective driving of opposite side wheels of the vehicle.

The main object of this invention is to provide a power transmission including both instant reversing capability and vehicle steerage ability when the transmission is utilized in pairs for driving opposite side wheels of an associated vehicle.

Another object of this invention is to provide a power transmission apparatus constructed in a manner whereby each power transmission has an individual direction reversing control and an individual clutch control.

Another important object of this invention is to provide a power transmission in accordance with the preceding objects and constructed in a manner whereby a pair of the transmissions may be readily incorporated into the construction of various forms of wheeled tractive vehicles.

A final object of this invention to be specifically enumerated herein is to provide a transmission in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a horizontal sectional view on somewhat of a reduced scale taken substantially upon a plane indicated by the section line 5—5 of FIG. 3;

FIG. 6 is a fragmentary enlarged vertical sectional view taken substantially upon a plane indicated by the section line 6—6 of FIG. 5;

FIG. 7 is a schematic perspective view of the power input portions of the pair of transmissions and illustrating the reversing and main clutch controls therefor; and FIG. 8 is a top plan view of a typical form of wheeled vehicle with which a pair of the power transmissions of the instant invention are operatively associated.

DETAILED DESCRIPTION OF THE INVENTION

Figures 1, 2:
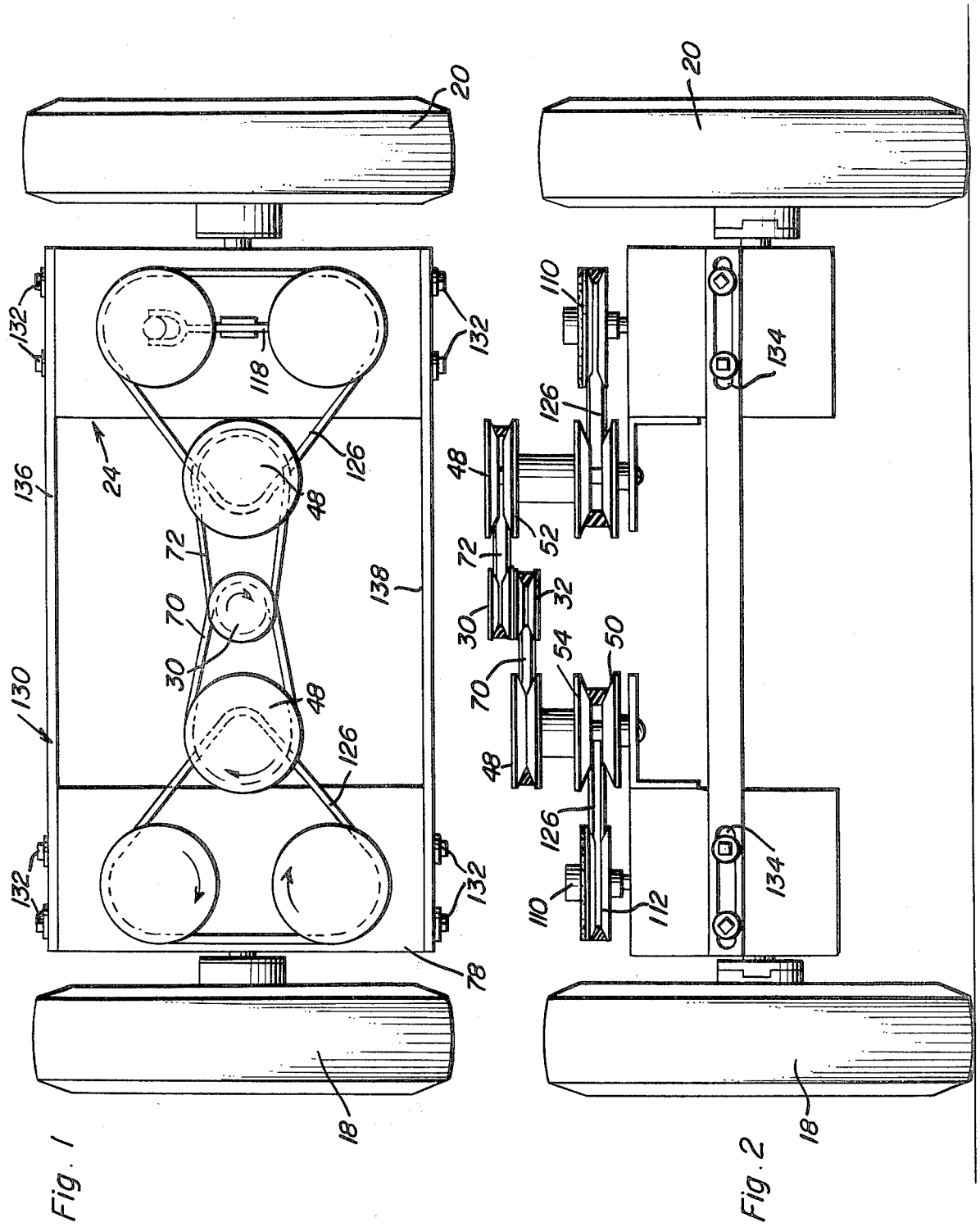
FIG. 1 is a top plan view of a wheeled support assembly for a vehicle including opposite side wheels and with a pair of the instant reversing transmissions of the instant invention operatively associated with the opposite side vehicle wheels.
FIG. 2 is an end elevational view of the assemblage illustrated in FIG. 1.

Referring now more specifically to FIG. 8, the numeral 10 generally designates a wheeled vehicle including a main frame 12 having front dirigible wheels 14 and 16 as well as rear wheels 18 and 20 rotatable about fixed horizontal transverse axes.

First and second transmissions referred to in general by the reference numerals 22 and 24 are operatively associated with the wheels 18 and 20 for selectively driving the latter in the same or opposite directions and the transmissions 22 and 24 receive the input of rotational torque from a powered shaft 26.

Figure 3:
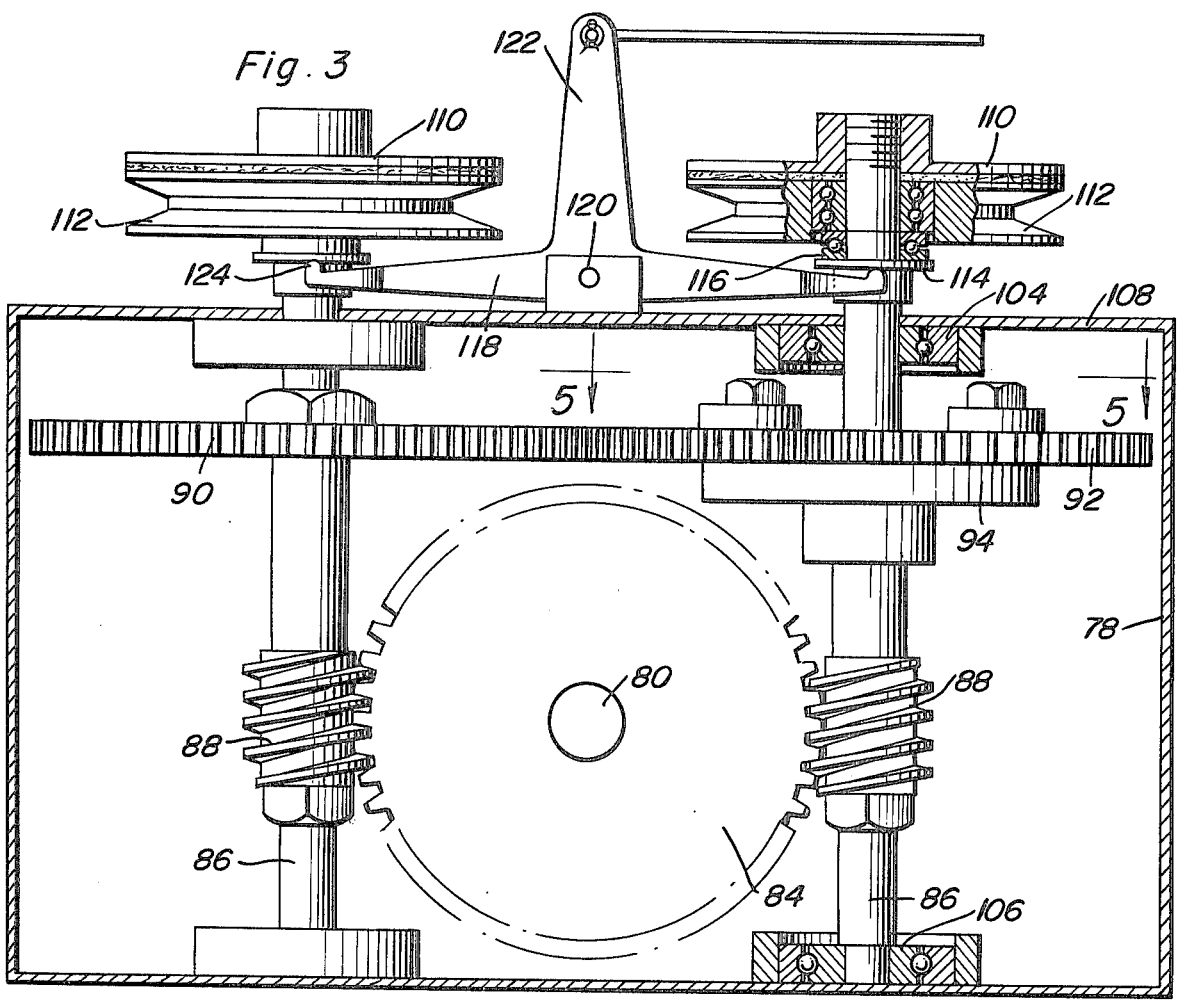
FIG. 3 is an enlarged fragmentary longitudinal vertical sectional view taken substantially upon a plane passing through the center of one of the transmissions.
Figure 4:
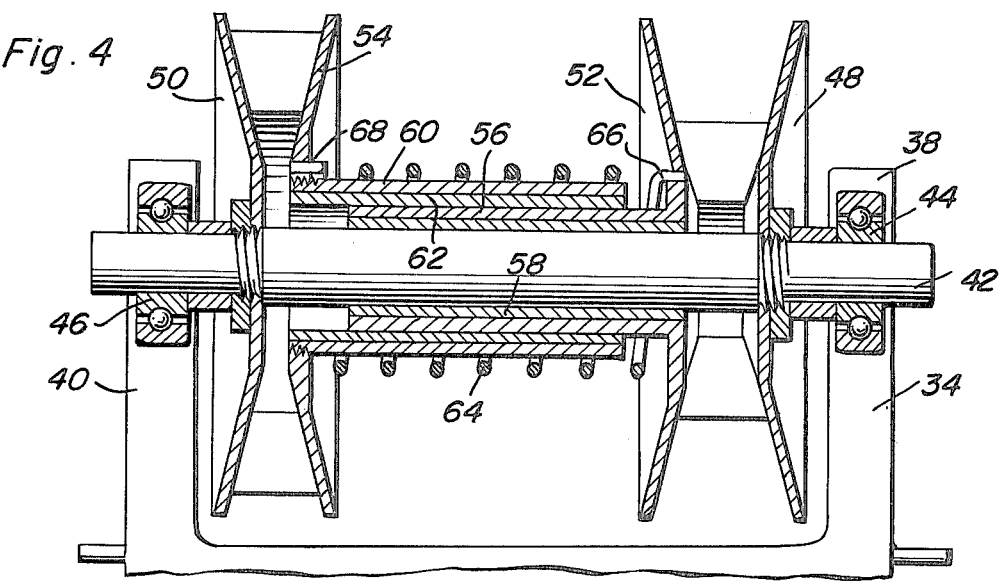
FIG. 4 is an enlarged fragmentary sectional view illustrating the clutch and variable ratio drive structure of one of the transmissions.

With attention invited now more specifically to FIGS. 3, 4 and 7 of the drawings, a motor 28 is provided and includes a powered output shaft comprising the powered shaft 26. The shaft 26 has axially spaced pulley wheels 30 and 32 mounted thereon and a pair of swingably mounted clutch pulley frames 34 and 36 are oscillatably supported from the frame 12 for angular displacement about upstanding axes. The pulley frames 34 and 36 are identical and each includes a pair of swingable spaced arms 38 and 40 between whose free ends a shaft 42 is rotatably journaled by means of bearings 44 and 46. The shaft 42 has a first pair of opposite end pulley side plates 48 and 50 mounted thereon for rotation therewith and axially shiftable pulley side plates 52 and 54 oppose the side plates 48 and 50. The plate 52 is carried by a mounting sleeve 56 journaled on the shaft 42 between the plates 48 and 50 by means of a bearing sleeve 58 and the plate 54 is carried by a sleeve 60 journaled on the sleeve 56 by means of a bearing sleeve 62. The sleeves 56, 58, 60 and 62 are telescoped over each other and a coiled compression spring 64 is telescoped over the sleeve 60 and has its opposite ends 66 and 68 anchored to the plates 52 and 54.

A pair of endless drive belts 70 and 72 are engaged about the pulleys 30 and 32 and also about each of the input pulleys defined by the corresponding side plates 48 and 52 of the corresponding frame 34 and 36. The frames 34 and 36 include horizontally inwardly projecting control arms 74 to which foot pedal actuated control rods 76 are connected.

Each transmission 22 and 24 additionally includes a housing 78 from which an output shaft 80 is journaled, the wheels 18 and 20 being mounted on the corresponding output shaft 80 by means of a manually operable clutch assembly 82 under the control of any suitable control therefor.

The output shafts 80 each have a worm wheel 84 mounted thereon and each housing 78 has a pair of input shafts 86 journaled therein on opposite sides of the corresponding output shaft 80. The input shafts 86 include identical worm gears 88 mounted thereon and meshed with diametrically opposite portions of the worm wheel 84. In addition, one of the shafts 86 has a gear wheel 90 mounted thereon for rotation therewith and the other shaft 86 has a gear wheel 92 mounted thereon for rotation therewith. However, the gear 92 is supported from a collar 94 mounted on the corresponding shaft 86 by means of suitable fasteners 96 received through arcuate slots 98 in the corresponding wheel 92 and the angular displacement of the collar 94 relative to the corresponding gear wheel 92 may be adjusted by means of an eccentric 100 including an offset portion 102 received through a suitable opening 102 formed in the gear wheel 92 supported from the collar 94. In this manner, the shafts 86 are geared together by means of the gear wheels 90 and 92 for simultaneous inverse rotation and the angular displacement of the worm gear 88 relative to the associated gear wheel 92 may be adjusted in order to assure proper meshing of both worm gears 88 with the worm wheel 84.

The shafts 86 are vertically disposed in the housings 78 and journaled therefrom by means of upper and lower bearing assemblies 104 and 106. The upper ends of the shafts 86 project upwardly through the top wall 108 of the housing 78 and have friction discs 110 mounted on the upper ends thereof. Pulley wheels 112 are mounted on the shafts 86 below the friction disc 110 and thrust collars 114 are rotatably mounted on the shafts 86 below the pulley wheels 112 for rotation relative to the shafts 86 and axial shifting therealong, the thrust collars 114 including thrust bearings 116 engageable with the pulley wheels 112 in order to shift the latter upwardly into engagement with their friction disc 110. Also, each housing 78 has a forked clutch lever 118 oscillatably supported therefrom as at 120 intermediate its opposite ends and each clutch lever 118 includes an upwardly projecting arm 122, the opposite ends of the lever 118 being forked and engaged with the underside of the corresponding thrust collars 114 as at 124.

An endless drive belt 126 is trained about each pair of pulley wheels 112 and received between the corresponding side plates 50 and 54 defining the lower pulley on the adjacent frame 34, 36. Of course, the compression spring 64 tends to bias the plates 52 and 54 toward the plates 48 and 50 and thereby maintains corresponding belts 70 and 126 tensioned at all times however, forward shifting of either rods 76 will of course cause sufficient swinging of the corresponding frame 34 to render the corresponding belt 70 slack and to thereby interrupt the drive transmission of torque from the shaft 26 to the corresponding shaft 42. Further, it will be seen from FIGS. 1 and 2 of the drawings that the rear wheels 18 and 20 of the vehicle 10 as well as the corresponding transmissions 22 and 24 are supported from a support frame referred to in general by the reference numeral 130 relative to which the housings 78 are adjustable by means of fasteners 132 secured through slots 134 formed in the longitudinally spaced front and rear transverse members 136 and 138 of the frame 130.

A pair of operating rods 140 have their rear ends anchored to the upper ends of the arms 122 and the forward ends of the rods 140 are connected to crank arms 142 carried by the lower ends of upstanding operating shafts 144 including hinged operating levers 146 at their upper ends.

In operation, with the assumption that the eccentrics 100 have been properly adjusted in order to insure that each pair of worm gears 88 will be properly meshed with the corresponding worm wheel 84, when the powered shaft 26 is rotating and the pedals 148 to which the front ends of the rods 76 are connected have their upper ends displaced forwardly, the belts 70 and 72 are slack and no torque from the shaft 26 is imparted to the shafts 42. However, the pedals 148 may be spring biased so as to return to rearwardly displaced positions with the rods 76 sufficiently rearwardly displaced in order to maintain the belts 70 and 52 tensioned whereby the shafts 42 will be driven. Accordingly, the shafts 42 drive the pulley wheels 112 through the belts 126. However, if the operating levers 146 are maintained in centered positions, the pulley wheels 112 may rotate relative to the friction discs 110 and thus power will not be transmitted from the shafts 42 to the corresponding pairs of shafts 86. On the other hand, if the operating levers or handles 146 are forwardly displaced the control levers 118 have their rear ends elevated and their forward ends lowered whereby the shafts 42 will drivingly connected to the rear shafts 86 in order to rotate the output shafts 80 in a first direction. On the other hand, if the control handles or levers 146 are pulled rearwardly, the front pulley wheels 112 will be frictionally engaged with the corresponding friction discs 110 in order that the shafts 42 will drive the front shafts 86 and the output shafts 80 will be driven in the opposite directions. Accordingly, the levers or handles 146 provide instant reversing controls for the shaft 80.

Braking of the vehicle 10 is automatically accomplished by forward displacement of the pedals 148 whereby the shafts 86 will idle and inasmuch as the latter are drivingly connected to the corresponding output shafts 80 by means of the worm gears 88, the interruption of power to the shafts 86 will automatically cause the shafts 80 to be braked inasmuch as the worm gears 88 may drive the worm wheel 84, but the worm wheel 84 may not drive the worm gears 88.

Clutches 82 are provided to enable the worm wheels 84 to be disconnected from the wheels 18 and 20 thereby enabling the latter to be rotated in the event it is desired to push the vehicle 10 without the shaft 26 rotating.

Of course, inasmuch as the levers 146 may be inversely operated, the shafts 80 may be driven in opposite directions whereby the vehicle 10 may spin about a center point substantially in alignment with the shaft 26. The caster wheels 14 and 16 at the forward end of the vehicle 10 enable the latter to turn in any direction in response to selective driving of the wheels 18 and 20.

Each set of pulley plates 50, 54 and 52, 48 defines a pair of pulleys which inversely increase and decrease in effective diameter as the corresponding foot pedal 148 is shifted between its rearmost position and a forward position with the pedal 148 displaced rearwardly from its forwardmost position sufficient to tighten the belt 70. Accordingly, steerage of the vehicle 10 by driving the wheels 18 and 20 at different speeds may be accomplished as well as by declutching or reverse driving a selected drive wheel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A power transmission including a pair of input shafts, first means drivingly connecting said input shafts for equal inverse rotation, an output shaft, second means drivingly connecting each of said input shafts to said output shaft for rotation of the latter in response to inverse rotation of said input shafts, a powered shaft, and third means operative to drivingly connect said powered shaft to a selected input shaft for rotation of either of the input shafts in the same direction in response to a given directional rotation of said powered shaft.

2. The combination of claim 1 wherein said second means includes a worm wheel mounted on said output shaft for rotation therewith and a pair of similar worm gears mounted on said input shafts for rotation therewith and meshed with spaced peripheral portions of said worm wheel.

3. The combination of claim 1 wherein said input shafts and said worm gears are disposed in parallel relation and said worm gears are meshed with diametrically opposite portions of said worm wheel.

4. The combination of claim 1 wherein said third means comprises a drive wheel mounted on said powered shaft, a pair of driven wheels mounted on said input shafts for rotation relative thereto, torque transfer means drivingly connecting said drive wheel to said driven wheels, and selectively operable clutch means for drivingly connecting each of said driven wheels to the corresponding input shaft.

5. The combination of claim 4 wherein said second means includes a worm wheel mounted on said output shaft for rotation therewith and a pair of similar worm gears mounted on said input shafts for rotation therewith and meshed with spaced peripheral portions of said worm wheel.

6. The combination of claim 5 wherein said input shafts and said worm gears are disposed in parallel relation and said worm gears are meshed with diametrically opposite portions of said worm wheel.

7. The combination of claim 4 wherein said driven and drive wheels comprise pulley wheels and said torque transfer means includes a drive belt.

8. The combination of claim 1 including a second power transmission corresponding to the first mentioned transmission, a vehicle having opposite side drive wheels, said transmissions being supported from said vehicle with the output shafts of said transmissions drivingly connected to said drive wheels, said powered shaft comprising the output shaft of a rotary torque power source mounted on said vehicle.

9. The combination of claim 4 wherein said torque transfer means includes means operative to selectively infinitely vary the drive ratio between said drive wheel and said driven wheels.

* * * * *